United States Patent
Panda et al.

(10) Patent No.: US 12,289,203 B1
(45) Date of Patent: Apr. 29, 2025

(54) CONTROLLING DOWNLINK INTERFACE CONFIGURATION BASED ON UPLINK INTERFACE NETWORK AND PROTOCOL STATE

(71) Applicant: Juniper Networks, Inc., Sunnyvale, CA (US)

(72) Inventors: Pravas Kumar Panda, Karnataka (IN); Manas Ranjan Panda, Karnataka (IN); Madhusudhana Malur Venkatagiri, Bangalore (IN); Anand Vardhan, Bangalore (IN); Venkata Duggirala, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/515,505

(22) Filed: Oct. 31, 2021

(51) Int. Cl.
*H04L 41/0816* (2022.01)
*H04L 12/46* (2006.01)
*H04L 45/24* (2022.01)

(52) U.S. Cl.
CPC ...... *H04L 41/0816* (2013.01); *H04L 12/4641* (2013.01); *H04L 45/245* (2013.01)

(58) Field of Classification Search
CPC ....... H04L 45/245; H04L 45/28; H04L 45/22; H04L 45/24; H04L 69/18; H04L 43/18; H04L 41/0816; H04L 12/4641
See application file for complete search history.

(56) References Cited

U.S. PATENT DOCUMENTS

| 2014/0219289 | A1* | 8/2014 | Ye | H04L 41/0663 370/420 |
| 2016/0301597 | A1* | 10/2016 | Jayakumar | H04L 45/245 |
| 2020/0120408 | A1 | 4/2020 | Boyd et al. | |
| 2022/0337513 | A1* | 10/2022 | Gopalarathnam | H04L 43/0811 |

FOREIGN PATENT DOCUMENTS

| CN | 102932183 A | * | 2/2013 | |
| CN | 103067291 A | * | 4/2013 | |
| CN | 111988213 A | * | 11/2020 | H04L 12/4633 |

OTHER PUBLICATIONS

Junos, "Uplink Failure Detection on Switches", https://www.juniper.net/documentation/us/en/software/junos/network-mgmt/topics/topic-map/uplink-failure-detection-on-switches.html, Oct. 4, 2014 (Year: 2014).*

(Continued)

*Primary Examiner* — Messeret F Gebre
(74) *Attorney, Agent, or Firm* — Harrity & Harrity, LLP

(57) ABSTRACT

A customer edge device is connected, in a multi-homed configuration, to a device via a downlink of the device and to another device via another downlink of the other device. The device may determine that each of one or more uplinks of the device has an inactive interface status and may thereby cause the downlink of the device to be down. This may cause the customer edge device to communicate network traffic via the other downlink of the other device. The device may determine that at least one uplink, of the one or more uplinks, has an active interface status and may thereby cause the downlink to be up. This may cause the customer edge device to communicate network traffic via the downlink of the device.

20 Claims, 10 Drawing Sheets

(56) References Cited

OTHER PUBLICATIONS

Shaw, "Link-state tracking, VMware ESX and You", Jan. 22, 2010 (Year: 2010).*
"Uplink failure detection" (Year: 2015).*
Of UFD "Uplink Failure Detection on Switches" Mar. 2021, (Year: 2021).*
K. A. Noghani and A. Kassier, "SDN enhanced ethernet VPN for data center interconnect," 2017 IEEE 6th International Conference on Cloud Networking (CloudNet), Prague, Czech Republic, 2017, pp. 1-6. (Year: 2017).*
Noghani, K. A., & Kassler, A. (2019). SDN enhanced ethernet VPN for data center interconnect [arXiv]. ArXiv, , 6 pp (Year: 2019).*
K. A. Noghani, C. H. Benet, A. Kassler, A. Marotta, P. Jestin and V. V. Srivastava, "Automating Ethernet VPN deployment in SDN-based Data Centers," 2017 Fourth International Conference on Software Defined Systems (SDS), Valencia, Spain, 2017, pp. 61-66 (Year: 2017).*

* cited by examiner

CONTROLLING DOWNLINK INTERFACE CONFIGURATION BASED ON UPLINK INTERFACE NETWORK AND PROTOCOL STATE

BACKGROUND

An Ethernet virtual private network (EVPN) enables a group of dispersed customer sites to be connected using a Layer 2 virtual bridge. An EVPN may include customer edge (CE) devices connected to provider edge (PE) devices. In some cases, a CE is multi-homed with two or more PEs on the EVPN.

SUMMARY

Some implementations described herein relate to a device. The device may include one or more memories and one or more processors. The device may be configured to identify a downlink of the device and an uplink of the device. The device may be configured to determine that the downlink has an active physical status and that the uplink has an active physical status. The device may be configured to determine, based on determining that the downlink has an active physical status and that the uplink has an active physical status, that the uplink has an inactive interface status. The device may be configured to cause, based on determining that the uplink has an inactive interface status, the downlink to be down. The device may be configured to determine, after causing the downlink to be down, that the uplink has an active interface status. The device may be configured to cause, based on determining that the uplink has an active interface status, the downlink to be up.

Some implementations described herein relate to a non-transitory computer-readable medium that stores a set of instructions for a device. The set of instructions, when executed by one or more processors of the device, may cause the device to determine that an uplink of the device has an inactive interface status. The set of instructions, when executed by one or more processors of the device, may cause the device to cause, based on determining that the uplink has an inactive interface status, a downlink of the device to be down. The set of instructions, when executed by one or more processors of the device, may cause the device to determine, after causing the downlink to be down, that the uplink has an active interface status. The set of instructions, when executed by one or more processors of the device, may cause the device to cause, based on determining that the uplink has an active interface status, the downlink to be up.

Some implementations described herein relate to a method. The method may include determining, by a device, that each of one or more uplinks of the device has an inactive interface status. The method may include causing, by the device and based on determining that each of the one or more uplinks of the device has an inactive interface status, a downlink of the device to be down. The method may include determining, by the device after causing the downlink to be down, that at least one uplink, of the one or more uplinks, has an active interface status. The method may include causing, based on determining that the at least one uplink has an active interface status, the downlink to be up.

DETAILED DESCRIPTION

Figure 1A:
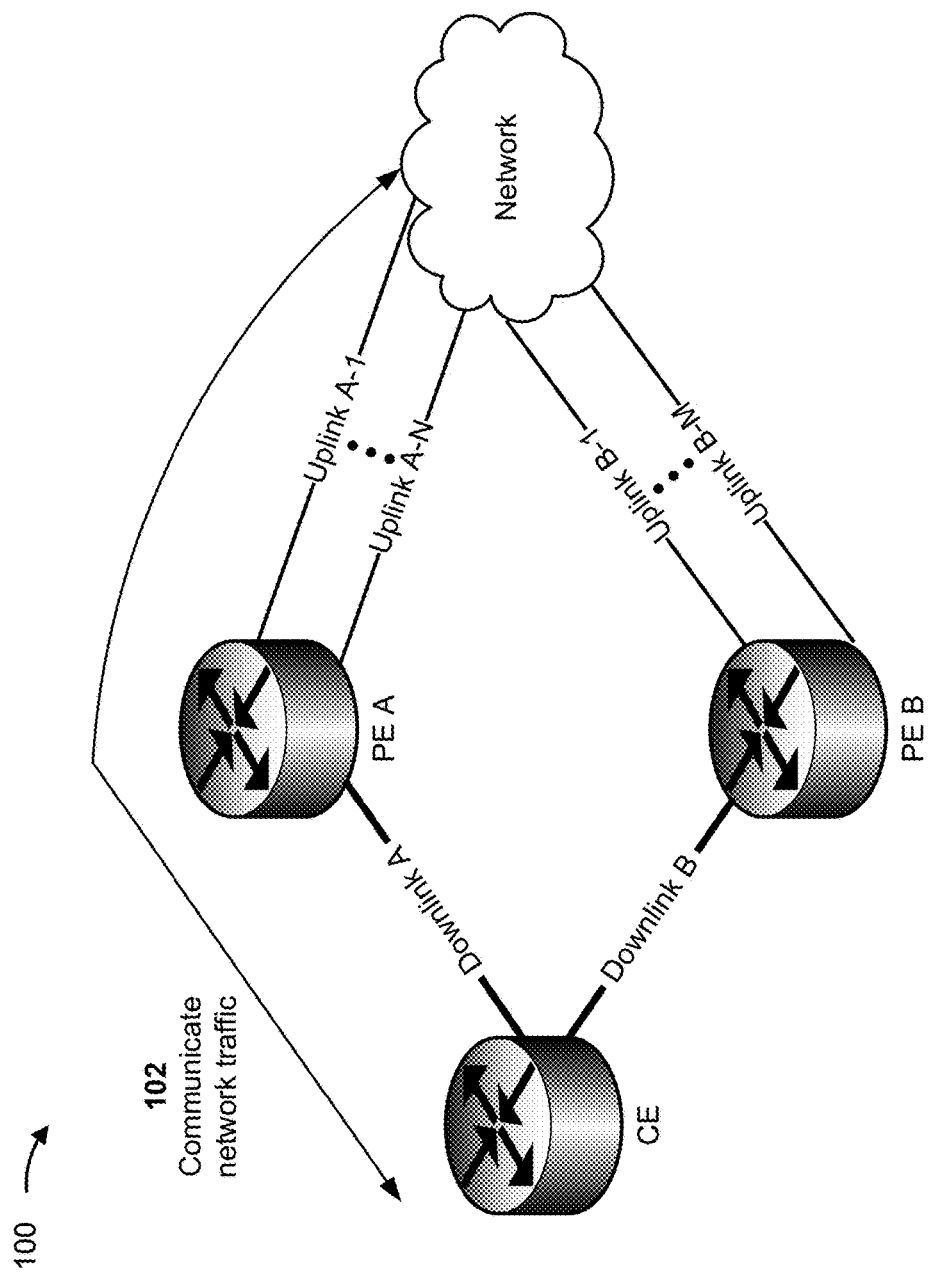
FIGS. 1A-1F are diagrams of an example implementation described herein.

The following detailed description of example implementations refers to the accompanying drawings. The same reference numbers in different drawings may identify the same or similar elements.

In a typical multi-homed configuration (e.g., of an EVPN and/or a virtual extensible local area network (VXLAN)), a customer edge device is connected to a primary provider edge device and to a secondary provider edge device. A primary downlink of the primary provider edge device connects the customer edge device to the primary provider edge device and a secondary downlink of the secondary provider edge device connects the customer edge device to the secondary provider edge device.

The primary provider edge device and the secondary provider edge device provide the customer edge device access to a network. When the primary provider edge device and the primary downlink are active, the customer edge device communicates network traffic with the network via the primary downlink and one or more uplinks of the primary provider edge device. When the primary provider edge device is not active (e.g., when the primary provider edge device fails) or when the one or more uplinks of the primary provider edge device are not active, the primary provider edge device causes the primary downlink to not be active and the customer edge device detects that the primary downlink is down and then communicates network traffic with the network via the secondary downlink and one or more uplinks of the secondary provider edge device. When the primary provider edge device and/or the primary downlink are active again (e.g., after the primary provider edge device reboots), the customer edge device detects that the primary downlink is up and then communicates network traffic with the network via the primary downlink and the one or more uplinks of the primary provider edge device again.

However, one or more protocols (e.g., a routing protocol, a control protocol, and/or another protocol) may not have finished initializing on the one or more uplinks of the primary provider edge device at the time that the customer edge device begins communicating network traffic with the network via the primary downlink and the one or more uplinks of the primary provider edge device again. Consequently, network traffic may be prevented from being routed by the primary provider edge device (e.g., the network traffic is dropped) until the one or more protocols have finished initializing on the one or more uplinks. This is often referred to as network traffic blackholing.

Some implementations described herein provide a customer edge device that is connected, in a multi-homed configuration, to a first provider edge device (e.g., a primary provider edge device) via a downlink (e.g., a primary downlink) of the first provider edge device and to a secondary provider edge device (e.g., a secondary provider edge device) via a downlink (e.g., a secondary downlink) of the second provider edge device. The first provider edge device may determine that each of one or more uplinks of the first provider edge device has an inactive interface status (e.g., because one or more protocols have not been initialized on the one or more uplinks) and may thereby cause the downlink of the first provider edge device to be down (e.g., cause the downlink to have a disabled link state and/or cause the downlink to be unpowered). This may cause the customer edge device to communicate network traffic via the downlink of the secondary provider edge device (e.g., instead of the downlink of the primary provider edge device). In some implementations, the first provider edge device may determine that at least one uplink, of the one or more uplinks of the first provider edge device, has an active interface status (e.g., because the one or more protocols have been initialized on the at least one uplink) and may thereby cause the downlink to be up (e.g., cause the downlink to have an enabled link state and/or cause the downlink to be powered). This may cause the customer edge device to communicate network traffic via the downlink of the first provider edge device.

In this way, some implementations described herein control the downlink of the first provider edge device based on an interface status of the at least one uplink of the first provider edge device. This prevents the first provider edge device from communicating network traffic with the customer edge device via the downlink of the first provider edge device until the at least one uplink of the first provider edge device has an active interface status (e.g., one or more protocols have been initialized on the at least one uplink). Accordingly, the customer edge device does not send network traffic to the first provider edge device via the downlink of the first provider edge device until the at least one uplink of the first provider edge device is able to route the network traffic (e.g., to a network). Thus, some implementations described herein prevent (or reduce) network traffic blackholing. Further, this reduces an amount of computing resources (e.g., processing resources, memory resources, communication resources, and/or power resources, among other examples) that would otherwise need to be used to resend network traffic that was lost due to blackholing and/or to diagnose and/or to address the cause and/or effect of the blackholing.

FIGS. 1A-1F are diagrams of one or more example implementations 100 described herein. Example implementation(s) 100 may include multiple network devices, such as a customer edge device (CE) and/or a plurality of provider edge devices (PEs), which are described in more detail below in connection with FIGS. 2-4. The plurality of PEs may provide the CE access to a network, such as a wide area network (WAN).

In some implementations, a PE, of the plurality of PEs, may have a "downlink" that is a link that connects the PE to the CE and one or more "uplinks" that are links that connect the PE to the network (and/or to other devices, such as other PEs, associated with the network). For example, as shown in FIGS. 1A-1F, a PE A may include a downlink A and one or more uplinks A-1 through A-N(where N≥1) and a PE B may include a downlink B and one or more uplinks B-1 through B-M (where M≥1). A PE may be configured to control, as further described herein, whether the downlink of the PE is "up" or "down." For example, the PE may be configured to cause the downlink to be up by causing the downlink to have an enabled link state and/or by causing the downlink to be powered (e.g., via Power over Ethernet (POE)). Alternatively, the PE may be configured to cause the downlink to be down by causing the downlink to have a disabled link state and/or by causing the downlink to be unpowered.

The PE may be configured to initialize and/or support, on each of the one or more uplinks of the PE, one or more protocols, such as a routing protocol (e.g., border gateway protocol (BGP), open shortest path first (OSPF) protocol, intermediate system to intermediate system (IS-IS) protocol, a control protocol (e.g., link aggregation control protocol (LACP)), and/or another protocol. In some implementations, the one or more uplinks may be included in a link aggregation group (LAG) associated with a particular protocol. In some implementations, the PE may be configured to determine an "interface status" of each of the one or more uplinks. For example, for a particular uplink, of the one or more uplinks, the PE may be configured to determine whether a particular protocol has been initialized on the particular uplink and/or whether network traffic associated with the particular protocol can be transmitted on the particular uplink. If so, the PE may determine that the particular uplink has an "active" interface status. Otherwise, the PE may determine that the particular uplink has an "inactive" interface status.

In some implementations, as shown in FIGS. 1A-1F, a CE may be connected to the PE A and the PE B in a multi-homed configuration (e.g., for an EVPN and/or a VXLAN). For example, the CE may be connected with the PE A via the downlink A of the PE A and may be connected with the PE B via the downlink B of the PE B. In some implementations, for the multi-homed configuration, the PE A may be a primary PE, the downlink A may be a primary link, the PE B may be a secondary PE, and the downlink B may be a secondary link. Accordingly, as shown in FIG. 1A, and by reference number 102, when the PE A is active (e.g., the PE A is online and available) and the downlink A is up (e.g., the downlink A has an enabled link state and/or the downlink A is powered), the CE may communicate network traffic with the network via the downlink A, the PE A, and at least one of the one or more uplinks A-1 through A-N(e.g., because the PE A is the primary PE and the downlink A is the primary link for the CE in the multi-homed configuration).

Figure 1B:
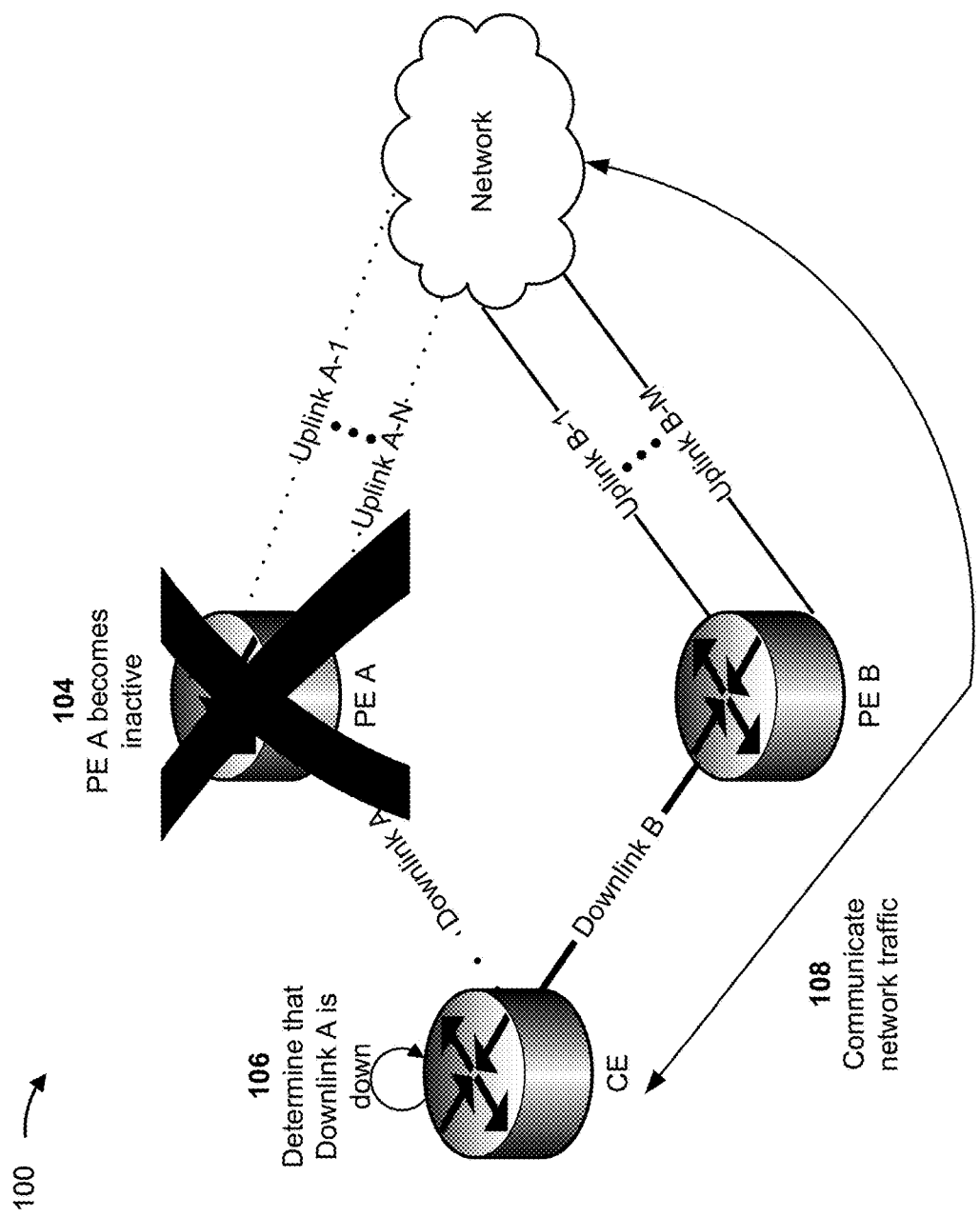

As shown in FIG. 1B, and by reference number 104, the PE A may become inactive. For example, the PE A may fail, may go offline, may reboot, or may otherwise be unavailable to transmit network traffic between the CE and the network. This may cause the downlink A to be down (e.g., cause the downlink A to have a disabled link state and/or cause the downlink to be unpowered). As another example, the one or more uplinks A-1 through A-N may fail or may otherwise be unavailable, and, accordingly, the PE A may cause the downlink A to be down. In an additional example, the PE A may determine that the one or more uplinks A-1 through A-N have an inactive interface status, and, accordingly, the PE A may cause the downlink A to be down. In another example, the PE A may determine that a network path associated with the one or more uplinks A-1 through A-N is down (e.g., such that the network is not accessible), and, accordingly, the PE A may cause the downlink A to be down.

As shown by reference number 106, the CE may determine that the downlink A is down. For example, the CE may determine that the downlink A has a disabled link state and/or that the downlink is unpowered (e.g., by attempting to send or receive messages via the downlink A). Accordingly, as shown in FIG. 1B, and by reference number 108, the CE may communicate network traffic with the network via the downlink B, the PE B, and at least one of the one or more uplinks B-1 through B-M (e.g., because the PE B is the secondary PE and the downlink B is the secondary link for the CE in the multi-homed configuration).

Figure 1C:
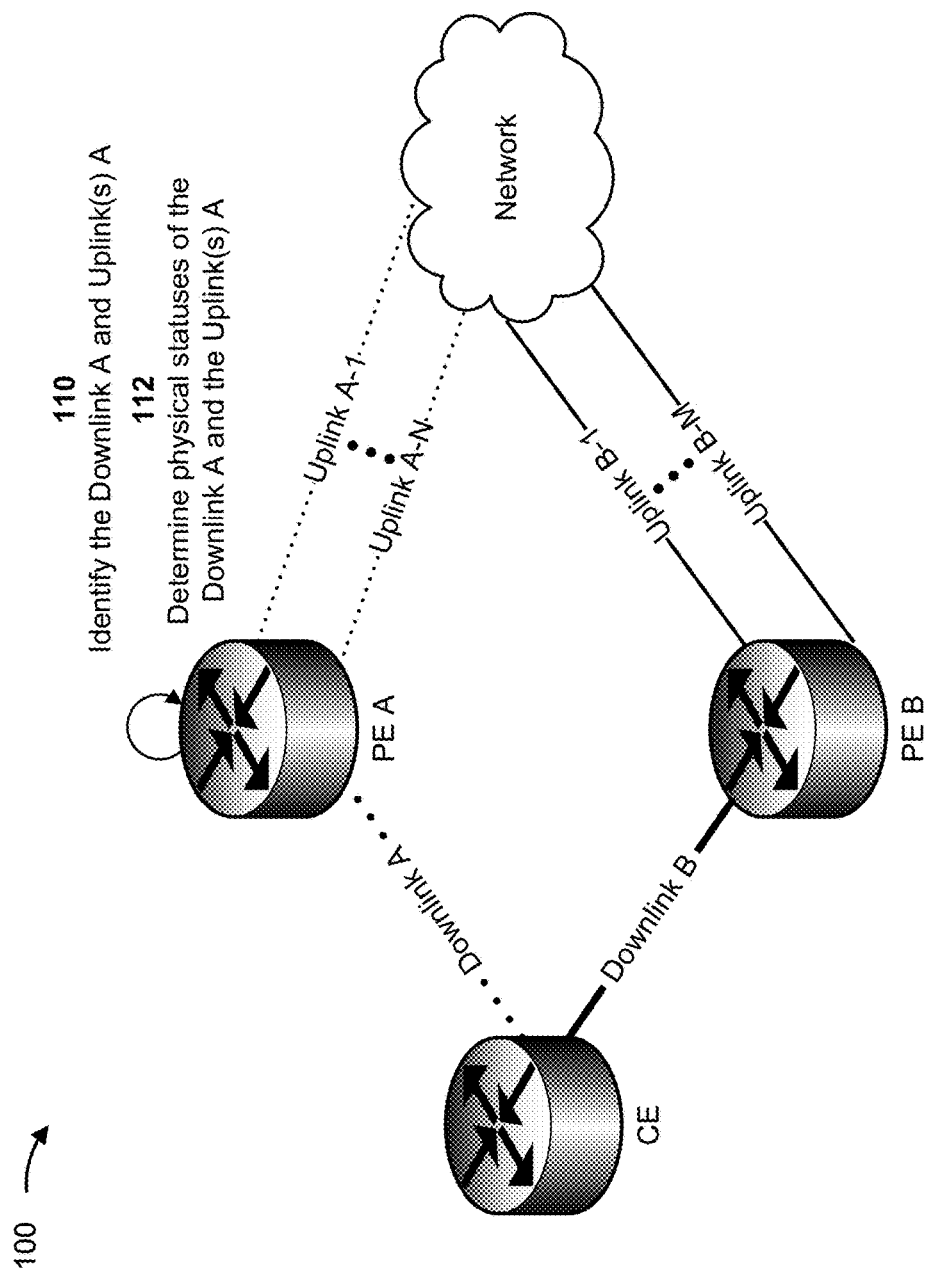
Figure 1D:
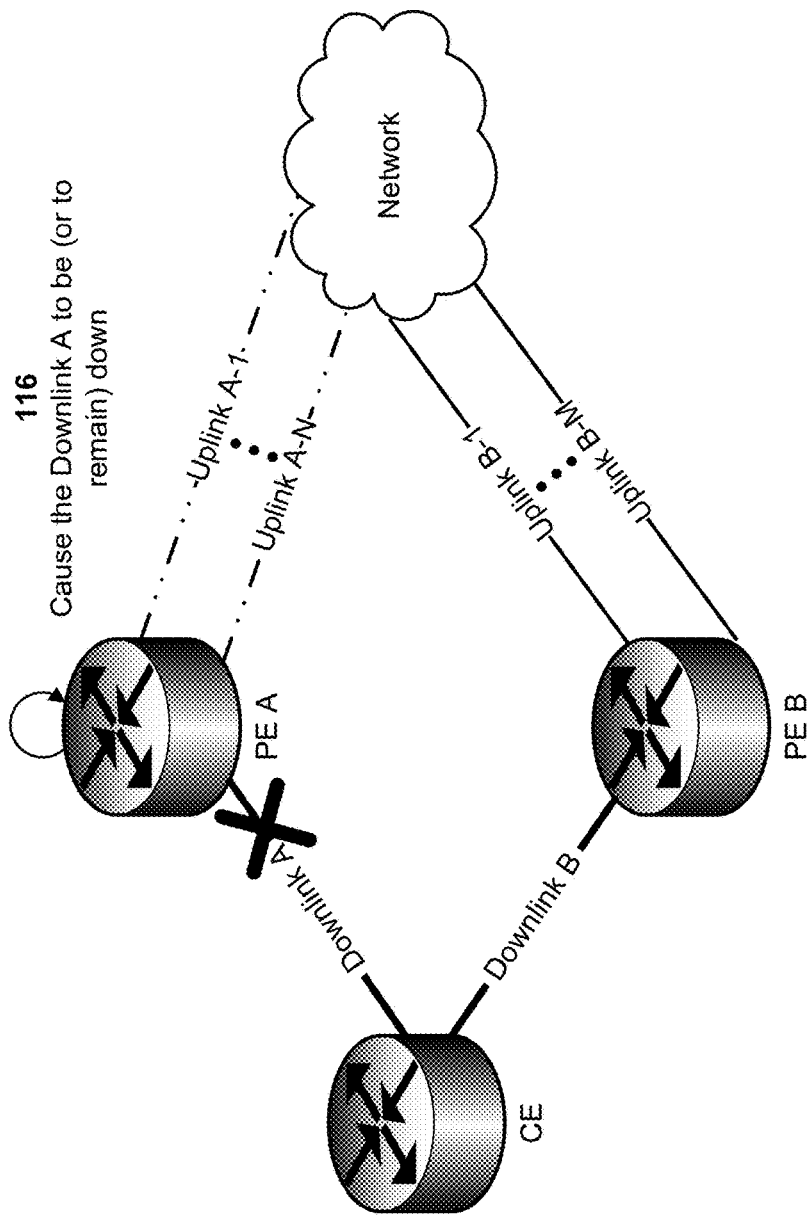
Figure 1E:
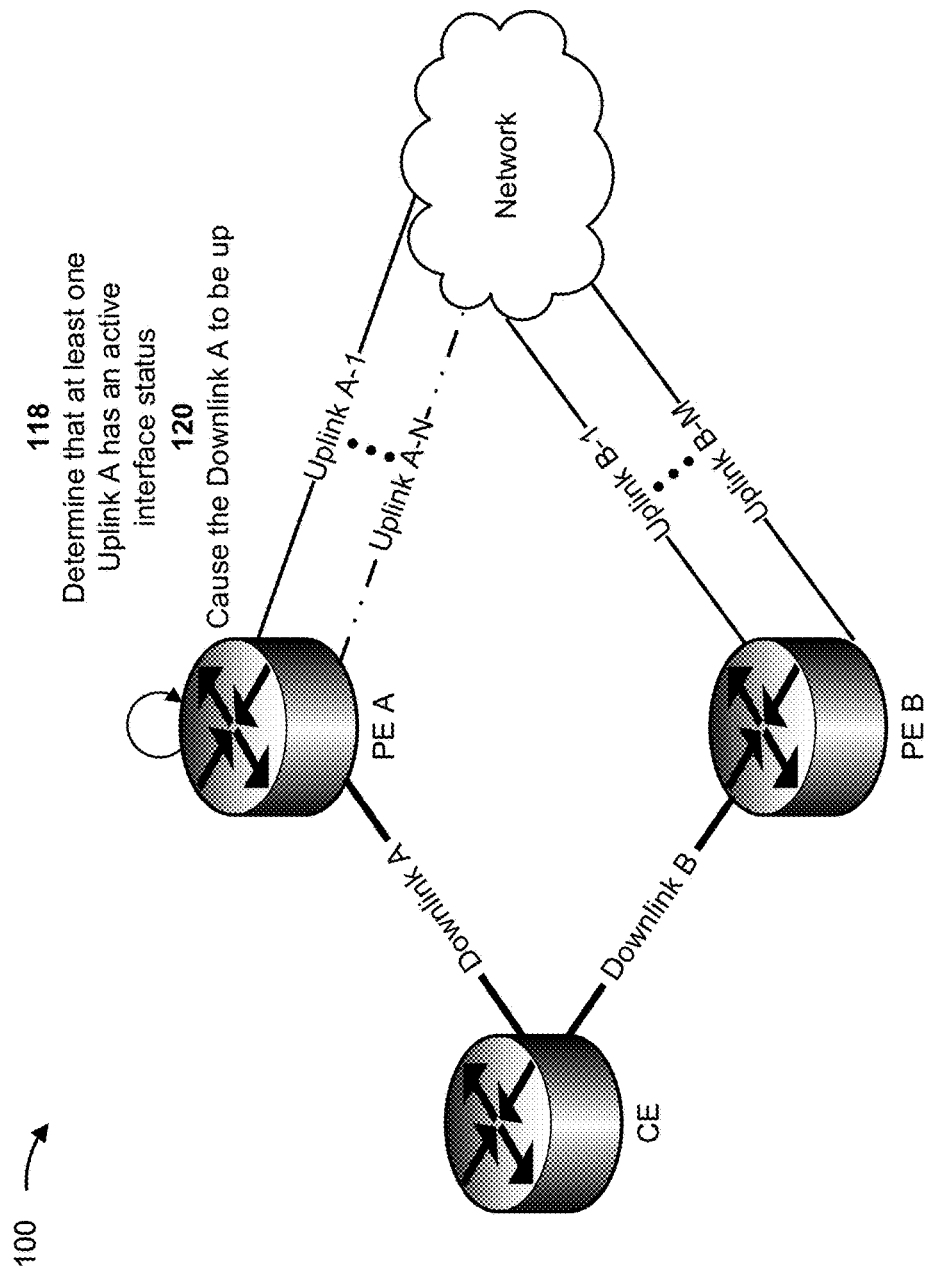

In some implementations, as shown in FIGS. 1C-1E, the PE A may perform a reinitialization process after failing, going offline, rebooting, or otherwise being unavailable. In this way, as part of the reinitialization process, the PE A may perform one or more processing steps to enable the PE A to act as the primary PE and the downlink A to act as the primary link for the CE in the multi-homed configuration.

As shown in FIG. 1C, and by reference number 110, the PE A may identify the downlink A and/or the uplinks A-1 through A-N. For example, as part of the reinitialization process, the PE A may determine that the PE A includes the downlink A and/or the uplinks A-1 through A-N. Additionally, or alternatively, as shown by reference number 112, the PE A may determine respective physical statuses of the downlink A and/or the uplinks A-1 through A-N. For example, the PE A may determine that the downlink A has an active physical status (e.g., the downlink A is physically connected to the CE) and/or that at least one of the uplinks A-1 through A-N has an active physical status (e.g., that at least one of the uplinks A-1 through A-N is physically connected to the network). Accordingly, the PE A may perform one or more or more of the processing steps described herein in relation to FIGS. 1D-1E (e.g., as part of the reinitialization process). As an alternative example, the PE A may determine that the downlink A has an inactive physical status (e.g., the downlink A is not physically connected to the CE) and/or that none of the uplinks A-1 through A-N has an active physical status (e.g., that none of the uplinks A-1 through A-N is physically connected to the network). Accordingly, the PE A may cease performing any additional processing steps (e.g., may cease performing the reinitialization process because the PE A is not physically connected to the CE and/or the network).

As shown in FIG. 1D, and by reference number 114, the PE A may determine that each of the uplinks A-1 through A-N has an inactive interface status (e.g., based on determining that the downlink A has an active physical status and/or that at least one of the uplinks A-1 through A-N has an active physical status). For example, the PE A may determine, for a particular uplink A (e.g., that has an active physical status), of the uplinks A-1 through A-N, that a particular protocol has not been initialized (or has not finished initializing) on the particular uplink A. As another example, the PE A may determine that network traffic associated with the particular protocol cannot be transmitted on the particular uplink A (e.g., because the particular protocol has not been initialized or has not finished initializing on the particular uplink A). In this way, the PE A may determine that the particular uplink A has an inactive interface status. Accordingly, as shown by reference number 116, the PE A may cause the downlink A to be (or to remain) down. For example, the PE A may cause the downlink to have a disabled link state and/or may cause the downlink to be unpowered. This prevents the PE A from communicating network traffic with the CE via the downlink A.

As shown in FIG. 1E, and by reference number 118, the PE A may determine that at least one of the uplinks A-1 through A-N has an active interface status (e.g., based on determining that the downlink A has an active physical status and/or that at least one of the uplinks A-1 through A-N has an active physical status, and/or based on determining that each of the uplinks A-1 through A-N has an inactive interface status). For example, the PE A may determine, for a particular uplink A (e.g., that has an active physical status), of the uplinks A-1 through A-N, that a particular protocol has been initialized (or has finished initializing) on the particular uplink A. As another example, the PE A may determine that network traffic associated with the particular protocol can be transmitted on the particular uplink (e.g., because the particular protocol has been initialized or has finished initializing on the particular uplink A). In this way, the PE A may determine that the particular uplink A has an active interface status. Accordingly, as shown by reference number 120, the PE A may cause the downlink A to be up. For example, the PE A may cause the downlink to have an enabled link state and/or may cause the downlink to be powered. This enables the PE A to communicate network traffic with the CE via the downlink A (e.g., as described herein in relation to FIG. 1F).

Figure 1F:
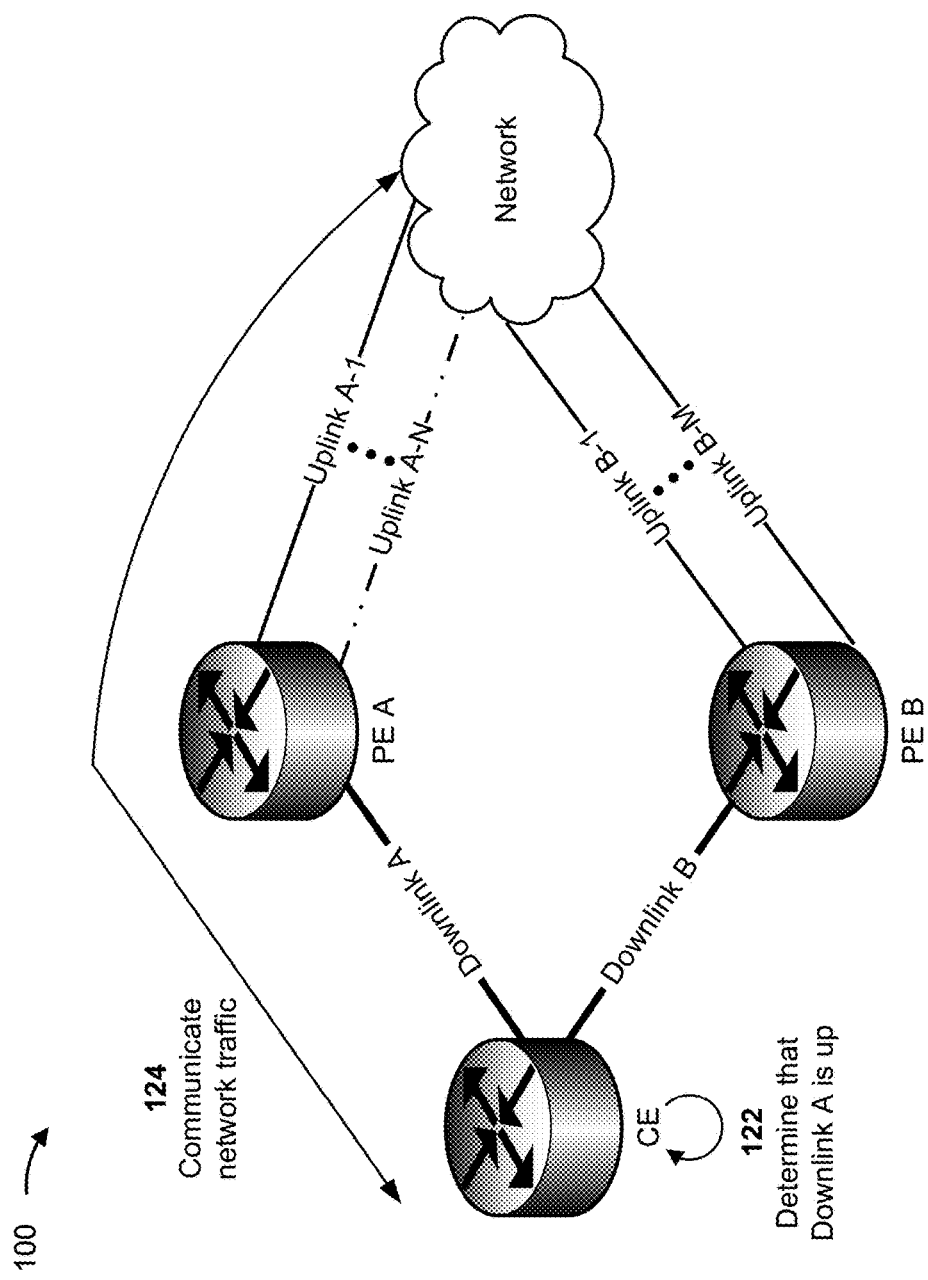

As shown in FIG. 1F, and by reference number 122, the CE may determine that the downlink A is up. For example, the CE may determine that the downlink A has an enabled link state and/or that the downlink is powered (e.g., by attempting to send or receive messages via the downlink A). Accordingly, as shown by reference number 124, the CE may communicate network traffic with the network via the downlink A, the PE A, and at least one of the one or more uplinks A-1 through A-N(e.g., at least one of the one or more uplinks A-1 through A-N that has an active physical status and an active interface status). In this way, the PE may cause the CE to communicate with the network using the primary PE and the primary link for the CE in the multi-homed configuration.

In some implementations, after the PE has caused the downlink A to be up, at least one of the one or more uplinks A-1 through A-N may encounter an issue. For example, a particular uplink A, of the one or more uplinks A-1 through A-N, may need to reinitialize the particular protocol on the particular uplink A. During reinitialization of the particular protocol on the particular uplink A, the PE A may determine that the particular uplink A has an inactive interface status again (e.g., in a similar manner as that described herein in relation to FIG. 1D and reference number 114). Accordingly, the PE may cause the downlink A to be down again (e.g., in a similar manner as that described herein in relation to FIG. 1D and reference number 116). The CE may determine that the downlink A is down again and the CE may communicate network traffic with the network via the downlink B, the PE B, and at least one of the one or more uplinks B-1 through B-M again (e.g., in a similar manner as that described herein in relation to FIG. 1B and reference numbers 106 and 108). After the particular protocol has been reinitialized on the particular uplink A, the PE A may determine that the particular uplink A has an active interface status again (e.g., in a similar manner as that described herein in relation to FIG. 1E and reference number 118). Accordingly, the PE may cause the downlink A to be up again (e.g., in a similar manner as that described herein in relation to FIG. 1E and reference number 120). The CE may determine that the downlink A is up again and the CE may communicate network traffic with the network via the downlink A, the PE A, and the particular uplink A (e.g., in a similar manner as that described herein in relation to FIG. 1F and reference numbers 122 and 124).

As indicated above, FIGS. 1A-1F are provided merely as one or more examples. Other examples may differ from what is described with regard to FIGS. 1A-1F.

Figure 2:
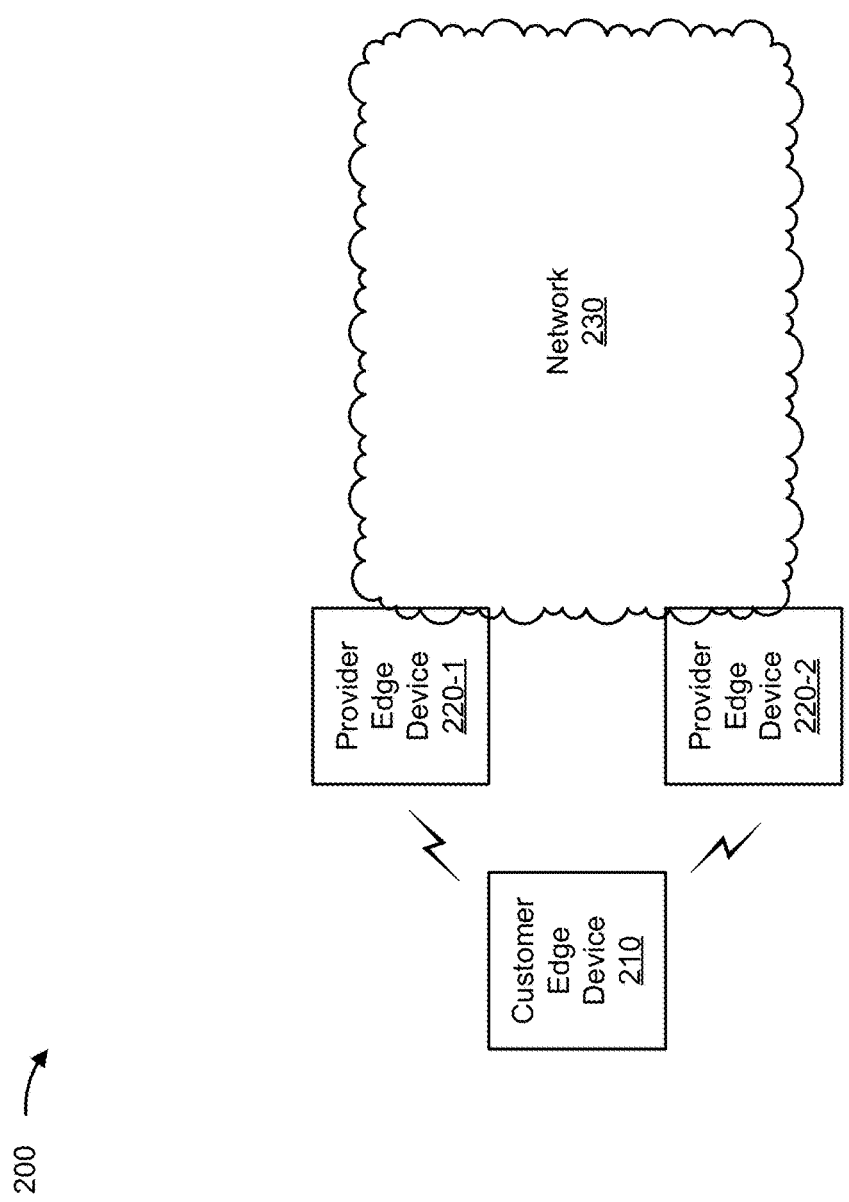
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a customer edge device 210, a plurality of provider edge devices 220 (shown as provider edge devices 220-1 and 220-2), and a network 230.

Customer edge device 210 includes one or more devices capable of generating, sending, receiving, processing, storing, routing, and/or providing network traffic in a manner described herein. For example, customer edge device 210 may include a firewall, a gateway, a switch, a hub, a bridge, a reverse proxy, a server (e.g., a proxy server), a security device, an intrusion detection device, a load balancer, or a similar type of device. Additionally, or alternatively, customer edge device 210 may include a router, such as a label switching router (LSR), a label edge router (LER), an ingress router, an egress router, a provider router (e.g., a provider edge router or a provider core router), a virtual router, or another type of router. In some implementations, customer edge device 210 may include a mobile phone (e.g., a smart phone or a radiotelephone), a laptop computer, a tablet computer, a desktop computer, a handheld computer, or a similar type of device. Customer edge device 210 may be connected to a provider edge device 220 via a link (e.g., a downlink) of the provider edge device 220, as described elsewhere herein. In some implementations, customer edge device 210 may transmit network traffic to provider edge device 220 and receive network traffic from provider edge device 220, as described elsewhere herein. Customer edge device 210 may be a physical device implemented within a housing, such as a chassis. In some implementations, customer edge device 210 may be a virtual device implemented by one or more computer devices of a cloud computing environment or a data center.

Provider edge device 220 includes one or more devices capable of receiving, processing, storing, routing, and/or providing network traffic in a manner described herein. For example, provider edge device 220 may include a firewall, a gateway, a switch, a hub, a bridge, a reverse proxy, a server (e.g., a proxy server), a security device, an intrusion detection device, a load balancer, or a similar type of device. Additionally, or alternatively, provider edge device 220 may include a router, such as an LSR, an LER, an ingress router, an egress router, a provider router (e.g., a provider edge router or a provider core router), a virtual router, or another type of router. In some implementations, the provider edge device 220 may include a downlink that connects the provider edge device 220 to the customer edge device 210 and/or may include one or more uplinks that connect the provider edge device 220 to the network 230. In some implementations, provider edge device 220 may transmit network traffic between the customer edge device 210 and the network 230 (e.g., via the downlink and the one or more uplinks) as described elsewhere herein. Provider edge device 220 may be a physical device implemented within a housing, such as a chassis. In some implementations, provider edge device 220 may be a virtual device implemented by one or more computer devices of a cloud computing environment or a data center.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
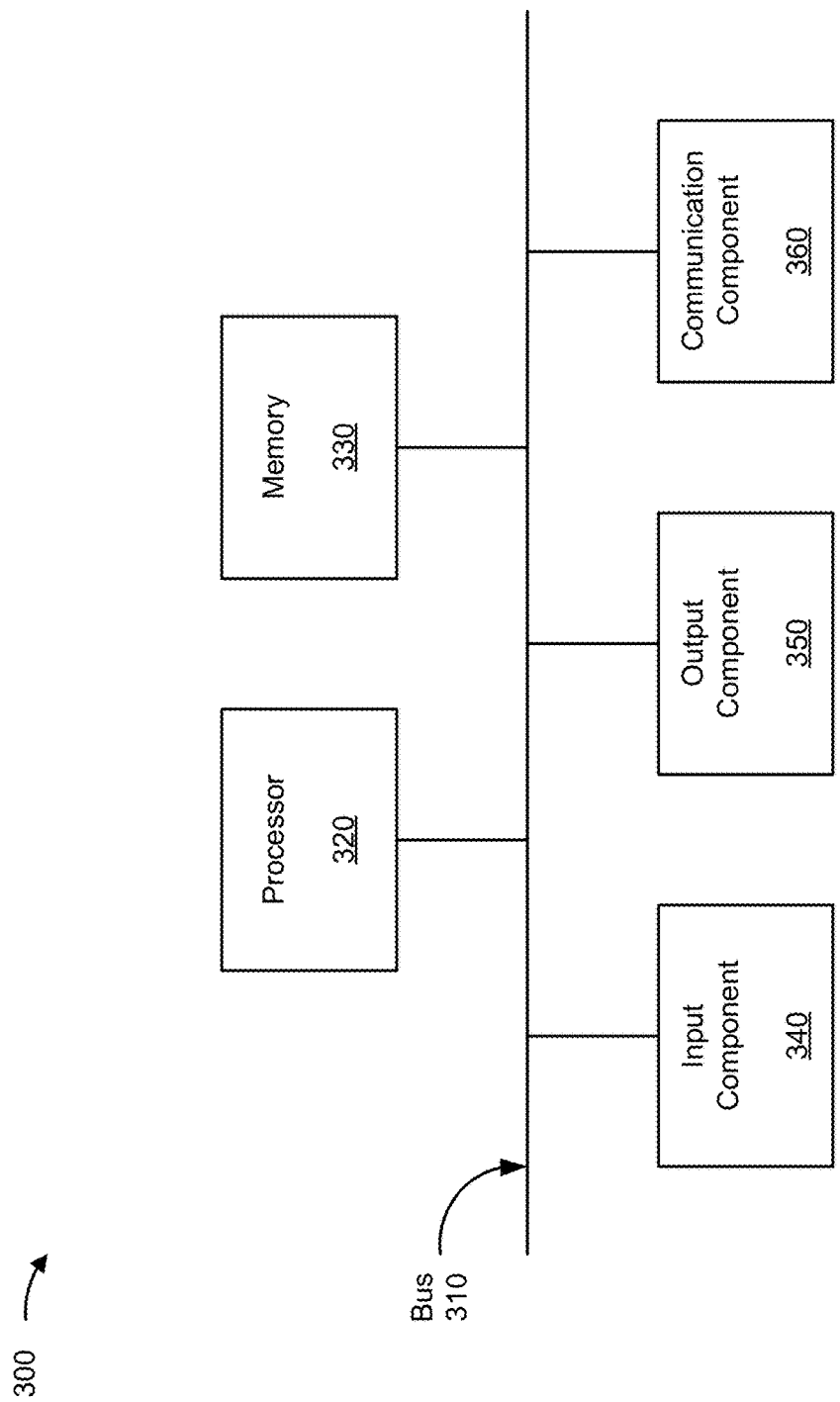
FIGS. 3-4 are diagrams of example components of one or more devices of FIG. 2.

FIG. 3 is a diagram of example components of a device 300, which may correspond to customer edge device 210 and/or provider edge device 220. In some implementations, customer edge device 210 and/or provider edge device 220 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
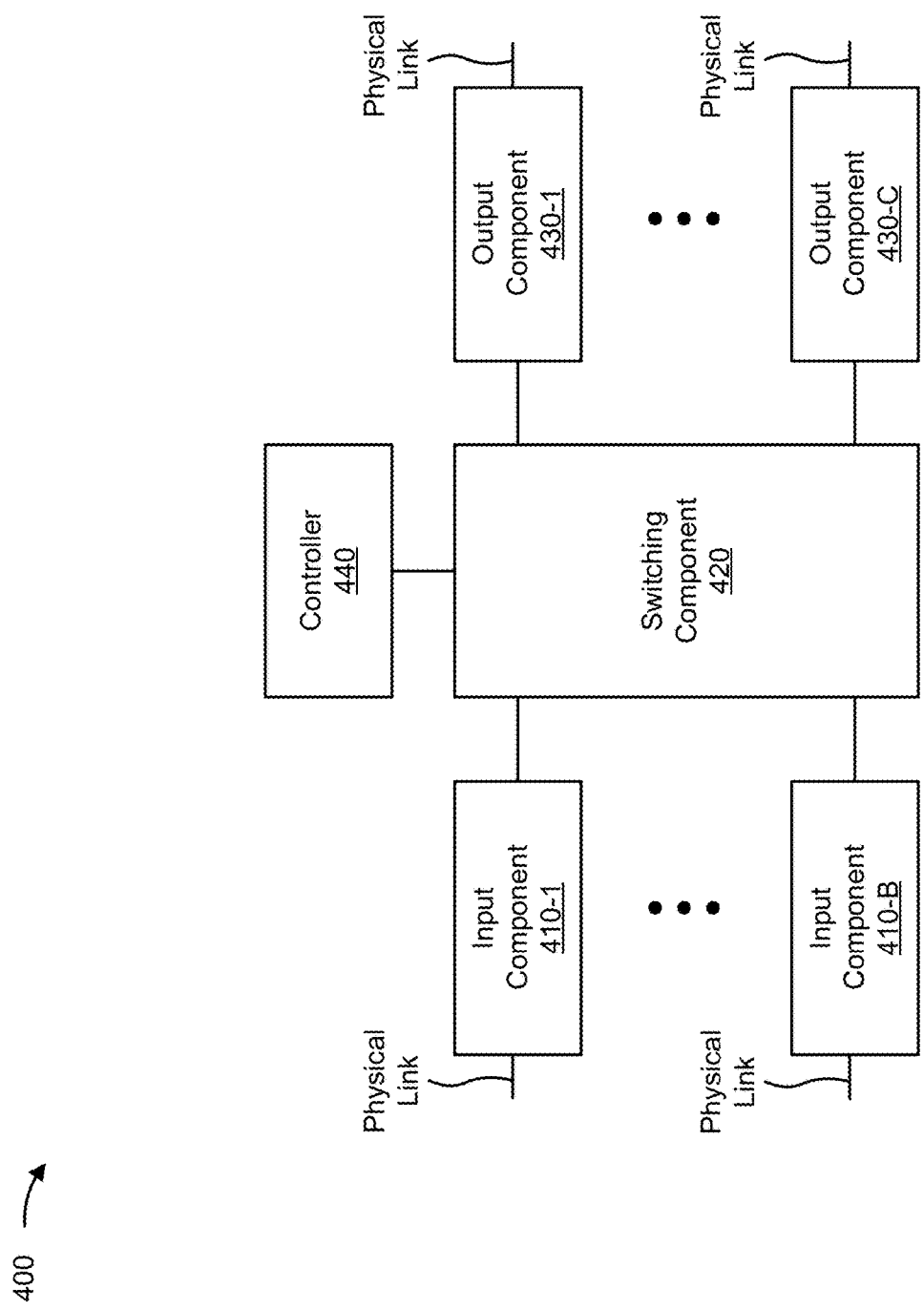

FIG. 4 is a diagram of example components of a device 400. Device 400 may correspond to customer edge device 210 and/or provider edge device 220. In some implementations, customer edge device 210 and/or provider edge device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
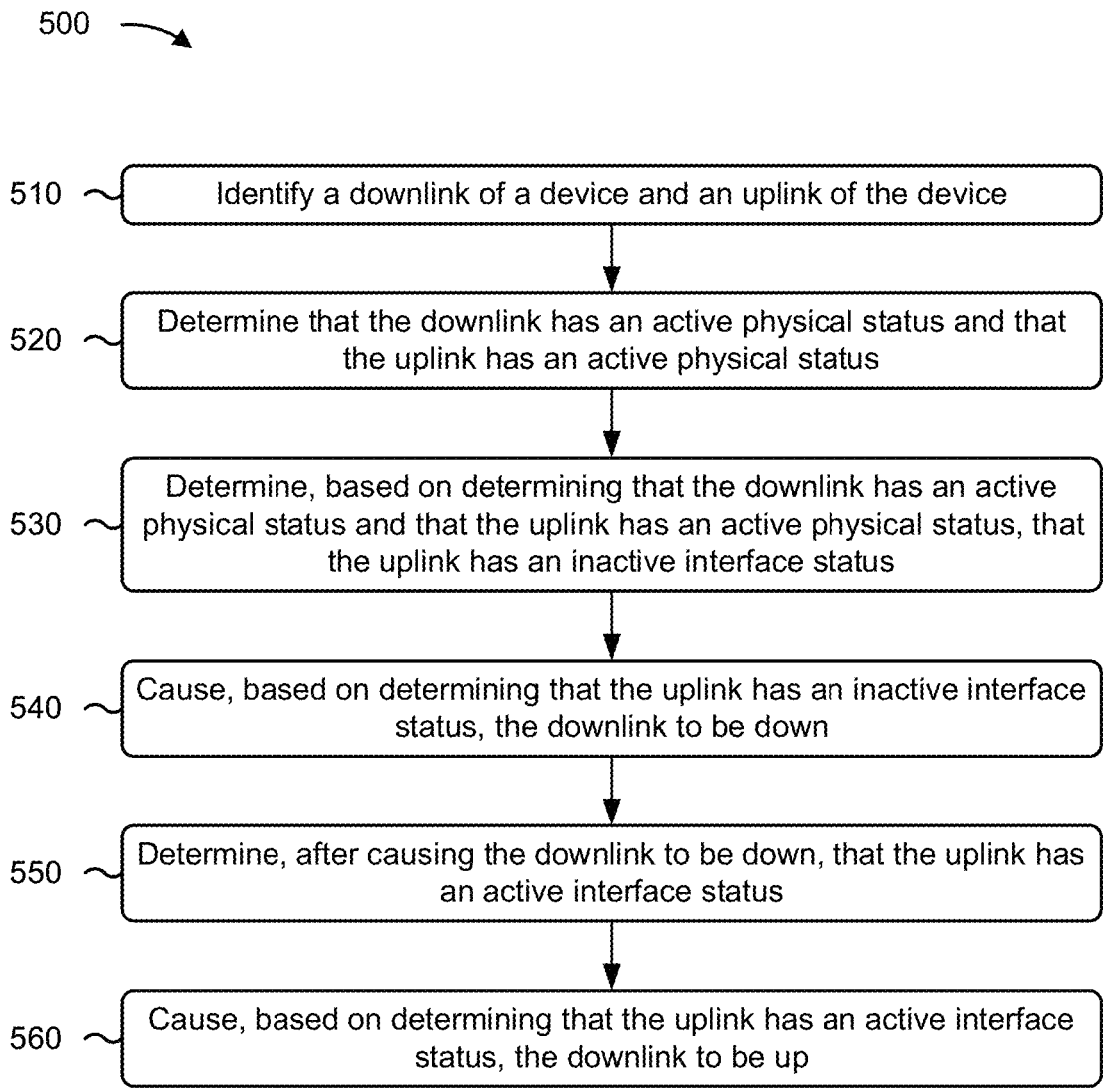
FIG. 5 is a flowchart of an example processes relating to controlling a downlink based on an uplink interface status.

FIG. 5 is a flowchart of an example process 500 associated with controlling a downlink based on an uplink interface status. In some implementations, one or more process blocks of FIG. 5 are performed by a device (e.g., provider edge device 220). In some implementations, one or more process blocks of FIG. 5 are performed by another device or a group of devices separate from or including the device, such as customer edge device 210. Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include identifying a downlink of the device and an uplink of the device (block 510). For example, the device may identify a downlink of the device and an uplink of the device, as described above.

As further shown in FIG. 5, process 500 may include determining that the downlink has an active physical status and that the uplink has an active physical status (block 520). For example, the device may determine that the downlink has an active physical status and that the uplink has an active physical status, as described above.

As further shown in FIG. 5, process 500 may include determining, based on determining that the downlink has an active physical status and that the uplink has an active physical status, that the uplink has an inactive interface status (block 530). For example, the device may determine, based on determining that the downlink has an active physical status and that the uplink has an active physical status, that the uplink has an inactive interface status, as described above.

As further shown in FIG. 5, process 500 may include causing, based on determining that the uplink has an inactive interface status, the downlink to be down (block 540). For example, the device may cause, based on determining that the uplink has an inactive interface status, the downlink to be down, as described above.

As further shown in FIG. 5, process 500 may include determining, after causing the downlink to be down, that the uplink has an active interface status (block 550). For example, the device may determine, after causing the downlink to be down, that the uplink has an active interface status, as described above.

As further shown in FIG. 5, process 500 may include causing, based on determining that the uplink has an active interface status, the downlink to be up (block 560). For example, the device may cause, based on determining that the uplink has an active interface status, the downlink to be up, as described above.

Process 500 may include additional implementations, such as any single implementation or any combination of implementations described below and/or in connection with one or more other processes described elsewhere herein.

In a first implementation, causing the downlink to be down includes at least one of causing the downlink to have a disabled link state, or causing the downlink to be unpowered.

In a second implementation, alone or in combination with the first implementation, causing the downlink to be up includes at least one of causing the downlink to have an enabled link state, or causing the downlink to be powered.

In a third implementation, alone or in combination with one or more of the first and second implementations, the downlink is connected to a customer edge device and the uplink is connected to a wide area network.

In a fourth implementation, alone or in combination with one or more of the first through third implementations, determining that the uplink has an inactive interface status includes determining that a particular protocol has not been initialized on the uplink.

In a fifth implementation, alone or in combination with one or more of the first through fourth implementations, determining that the uplink has an active interface status includes determining that a particular protocol has been initialized on the uplink.

In a sixth implementation, alone or in combination with one or more of the first through fifth implementations, process 500 includes determining, after causing the downlink to be up, that the uplink has an inactive interface status again, and causing, based on determining that the uplink has an inactive interface status again, the downlink to be down again.

In a seventh implementation, alone or in combination with one or more of the first through sixth implementations, process 500 includes determining, after causing the downlink to be down again, that the uplink has an active interface status again, and causing, based on determining that the uplink has an active interface status again, the downlink to be up.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, network traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more memories; and
one or more processors to:
identify a downlink of the device to a customer edge and an uplink of the device to a wide area network in a multi-homed configuration on an Ethernet virtual private network;
determine that the downlink has an active physical status and that the uplink has an active physical status,
wherein the device, via the downlink and the uplink, communicates network traffic with the wide area network and the customer edge;
determine whether network traffic associated with a particular protocol can be transmitted on the uplink,
wherein the particular protocol is one or more of:
border gateway protocol (BGP),
open shortest path first (OSPF) protocol, or
intermediate system to intermediate system (IS-IS) protocol;
determine, based on determining that the downlink has the active physical status and that the uplink has the active physical status, that the uplink has an inactive interface status,
wherein the uplink having the inactive interface status is based on the particular protocol not being initialized or finished initializing on the uplink;
cause, based on determining that the uplink has the inactive interface status, the downlink to be down,
wherein the one or more processors, when causing the downlink to be down, are to:
cause the downlink to be unpowered;
determine, after causing the downlink to be down and based on determining that the particular protocol has been initialized or has finished initializing on the uplink, that the uplink has an active interface status; and
cause, based on determining that the uplink has the active interface status, the downlink to be up.

2. The device of claim 1, wherein the one or more processors, when causing the downlink to be down, are to:
cause the downlink to have a disabled link state.

3. The device of claim 1, wherein the one or more processors, when causing the downlink to be up, are to at least one of:
cause the downlink to have an enabled link state; or
cause the downlink to be powered.

4. The device of claim 1, wherein the one or more processors are further to:
determine, after causing the downlink to be up, that the uplink has an inactive interface status again; and
cause, based on determining that the uplink has the inactive interface status again, the downlink to be down again.

5. The device of claim 4, wherein the one or more processors are further to:
determine, after causing the downlink to be down again, that the uplink has an active interface status again; and
cause, based on determining that the uplink has the active interface status again, the downlink to be up.

6. The device of claim 1, wherein the one or more processors, when determining that the uplink has the inactive interface status, are to:
determine that the network traffic associated with a particular protocol cannot be transmitted on the uplink.

7. The device of claim 1, wherein the one or more processors, when determining that the uplink has the active interface status, are to:
determine that the network traffic associated with the particular protocol can be transmitted on the uplink.

8. The device of claim 1, wherein the particular protocol is one or more of:
a routing protocol, or
a control protocol.

9. A non-transitory computer-readable medium storing a set of instructions, the set of instructions comprising:
one or more instructions that, when executed by one or more processors of a device, cause the device to:
determine that network traffic associated with a particular protocol can be transmitted on an uplink of the device,
wherein the particular protocol is one or more of:
border gateway protocol (BGP),
open shortest path first (OSPF) protocol, or
intermediate system to intermediate system (IS-IS) protocol;
determine that the uplink has an inactive interface status,
wherein the device is on an Ethernet virtual private network,
wherein the uplink is connected to a wide area network, and
wherein the uplink having the inactive interface status is based on the particular protocol not being initialized or finished initializing on the uplink;
cause, based on determining that the uplink has the inactive interface status, a downlink of the device to be down,
wherein the downlink is connected to a customer edge device, in a multi-homed configuration, and
wherein the one or more instructions, that cause the downlink to be down, cause the device to:
cause the downlink to be unpowered;
determine, after causing the downlink to be down and based on determining that the particular protocol has been initialized or has finished initializing on the uplink, that the uplink has an active interface status; and
cause, based on determining that the uplink has the active interface status, the downlink to be up,
wherein the device, via the downlink and the uplink, communicates network traffic with the wide area network and the customer edge device.

10. The non-transitory computer-readable medium of claim 9, wherein the one or more instructions, that cause the device to cause the downlink to be down, cause the device to:
cause the downlink to have a disabled link state.

11. The non-transitory computer-readable medium of claim 9, wherein the one or more instructions, that cause the device to cause the downlink to be up, cause the device to:
cause the downlink to have an enabled link state; or
cause the downlink to be powered.

12. The non-transitory computer-readable medium of claim 9, wherein:
the customer edge device is connected, in the multi-homed configuration, to the device via the downlink of the device and to another device via another downlink of the other device; and
the downlink is a primary link for the customer edge device in the multi-homed configuration.

13. The non-transitory computer-readable medium of claim 12, wherein causing the downlink of the device to be down is to cause the customer edge device to communicate the network traffic via the other downlink of the other device in the multi-homed configuration.

14. The non-transitory computer-readable medium of claim 12, wherein causing the downlink of the device to be up is to cause the customer edge device to communicate network traffic via the downlink of the device.

15. The non-transitory computer-readable medium of claim 9, wherein the one or more instructions, that cause the device to determine that the uplink has the inactive interface status, cause the device to:
determine that the network traffic associated with a particular protocol cannot be transmitted on the uplink.

16. The non-transitory computer-readable medium of claim 9, wherein the one or more instructions, that cause the device to determine that the uplink has the active interface status, cause the device to:
determine that the network traffic associated with a particular protocol can be transmitted on the uplink.

17. A method, comprising:
determining, by a device, whether network traffic associated with a particular protocol can be transmitted on one or more uplinks of the device,
wherein the particular protocol is one or more of:
border gateway protocol (BGP),
open shortest path first (OSPF) protocol, or
intermediate system to intermediate system (IS-IS) protocol;
determining, by the device, that each of one or more uplinks of the device has an inactive interface status,
wherein the device is on an Ethernet virtual private network,
wherein an uplink, of the one or more uplinks, is connected to a wide area network, and
wherein another uplink, of the one or more uplinks, has the inactive interface status based on a particular protocol not being initialized or finished initializing on the uplink;
causing, by the device and based on determining that each of the one or more uplinks of the device has the inactive interface status, a downlink of the device to be down,
wherein the downlink is connected to a customer edge device, and
wherein causing the downlink to be down comprises: causing the downlink to be unpowered;
determining, by the device after causing the downlink to be down and based on determining that the particular protocol has been initialized or has finished initializing on the uplink, that at least one uplink, of the one or more uplinks, has an active interface status; and
causing, based on determining that the at least one uplink has the active interface status, the downlink to be up,
wherein the device, via the downlink and the uplink, communicates network traffic with the wide area network and the customer edge.

18. The method of claim 17, wherein causing the downlink to be down is to prevent the device from communicating the network traffic with the customer edge device via the downlink.

19. The method of claim 17, wherein causing the downlink to be up is to cause the device to communicate the network traffic with the customer edge device via the downlink.

20. The method of claim 17, wherein the one or more uplinks are included in a link aggregation group of the device that is associated with the particular protocol.

* * * * *